United States Patent
Goulet et al.

(10) Patent No.: US 10,495,153 B2
(45) Date of Patent: Dec. 3, 2019

(54) POWER TAKE-OFF COUPLER COUNTERACTING AXIAL LOAD AND EQUIPMENT EQUIPPED THEREWITH

(75) Inventors: Denis Goulet, Saint-Pierre de Broughton (CA); Alain Thivierge, Broughton Station (CA); Louis Lamontagne, Thetford Mines (CA)

(73) Assignee: RAD Technologies Inc., Thetford Mines (CA)

( * ) Notice: Subject to any disclaimer, the term of this patent is extended or adjusted under 35 U.S.C. 154(b) by 0 days.

(21) Appl. No.: 13/597,790

(22) Filed: Aug. 29, 2012

(65) Prior Publication Data

US 2013/0230352 A1    Sep. 5, 2013

Related U.S. Application Data

(60) Provisional application No. 61/534,991, filed on Sep. 15, 2011, provisional application No. 61/529,002, filed on Aug. 30, 2011.

(51) Int. Cl.
*F16D 1/02* (2006.01)

(52) U.S. Cl.
CPC ........... *F16D 1/02* (2013.01); *Y10T 403/7045* (2015.01)

(58) Field of Classification Search
CPC ... F16D 3/18; F16D 1/101; F16D 1/02; F16D 2001/102; F16D 2001/103; F16D 2011/008; F16C 1/04; Y10T 403/7045; A01B 71/06; E21B 17/20
USPC ........ 464/149, 154, 156, 157; 403/348, 364; 74/15.6, 15.8
See application file for complete search history.

(56) References Cited

U.S. PATENT DOCUMENTS

| | | | | |
|---|---|---|---|---|
| 1,659,402 A |   | 2/1928 | Lewis | |
| 1,739,756 A | * | 12/1929 | Granville | 464/149 |
| 2,074,940 A | * | 3/1937 | Ricefield | F16D 3/68 |
| | | | | 464/149 |
| 2,200,641 A | * | 5/1940 | Ricefield | 464/149 X |
| 2,515,366 A | * | 7/1950 | Zublin | 464/149 X |
| 2,717,146 A | * | 9/1955 | Zublin | 464/149 X |
| 2,892,327 A | * | 6/1959 | Kressin | 464/157 X |
| 2,996,900 A | * | 8/1961 | Fermier | F16D 3/68 |
| | | | | 464/76 |
| 3,253,842 A | * | 5/1966 | Rabe | 403/364 X |
| 3,260,069 A | * | 7/1966 | Neilson et al. | 464/149 X |
| 4,362,520 A | * | 12/1982 | Perry | 464/149 |
| 4,600,037 A | * | 7/1986 | Hatten | |

(Continued)

FOREIGN PATENT DOCUMENTS

| | | | | |
|---|---|---|---|---|
| DE | 10233044 A1 | | 2/2004 | |
| FR | 2327441 A1 | * | 5/1977 | F16D 3/18 |

(Continued)

*Primary Examiner* — Matthieu F Setliff
(74) *Attorney, Agent, or Firm* — IP Delta Plus Inc.

(57) ABSTRACT

A Power Take-Off (PTO) coupler and equipment equipped therewith. The PTO coupler comprises a first extremity to be connected to the equipment and a second extremity. The second extremity has a plurality of teeth along a circumference thereof, wherein subsequent teeth are separated from one another by a gap, and each of the teeth has a base narrower than its top. When the PTO coupler is engaged to a corresponding receiving coupler, the interlocking of the plurality of teeth and gaps counteract axial load generated during operation of the PTO coupler.

5 Claims, 8 Drawing Sheets

(56) References Cited

U.S. PATENT DOCUMENTS

| | | | |
|---|---|---|---|
| 4,840,601 A * | 6/1989 | Denman | 464/157 |
| 6,053,922 A * | 4/2000 | Krause et al. | |
| 6,921,397 B2 * | 7/2005 | Corcoran et al. | |
| 7,674,064 B2 * | 3/2010 | Nakamura et al. | 403/348 |
| 8,366,559 B2 * | 2/2013 | Papenfuss et al. | 464/149 |
| 2009/0093317 A1 * | 4/2009 | Kajiwara et al. | 464/157 |
| 2013/0170901 A1 * | 7/2013 | Schuermann | 403/364 |

FOREIGN PATENT DOCUMENTS

| | | | | |
|---|---|---|---|---|
| FR | 2837246 A1 | 9/2003 | | |
| GB | 1457480 A * | 12/1976 | | A01D 41/16 |
| GB | 2296308 A | 6/1996 | | |
| GB | 2411939 A | 9/2005 | | |

\* cited by examiner

POWER TAKE-OFF COUPLER COUNTERACTING AXIAL LOAD AND EQUIPMENT EQUIPPED THEREWITH

FIELD

The present invention relates to a Power Take-Off (PTO) coupler and to an equipment equipped therewith, and more particularly to a PTO coupler capable of counteracting axial load.

BACKGROUND

Motorized vehicles are often used with different types of implements to perform a series of various operations. Although some implements are simply affixed to the vehicle to perform their function, other implements require power. Power from the vehicle is generally provided to the implement by means of a Power Take-Off (PTO) coupler. The PTO coupler is adapted for engaging a corresponding power coupler of the implement, and thereby provides power to the implement.

However, it has been observed that connection between the PTO coupler and the implement may be disengaged during operation by axial load generated between the implement and the vehicle.

There is therefore a need for a PTO coupler that alleviates the aforementioned problem.

SUMMARY

The present disclosure provides a Power Take-Off (PTO) coupler. The PTO coupler comprises a first and a second extremity. The first extremity is adapted to be mechanically connected to an equipment. The second extremity has a plurality of teeth along a circumference thereof, wherein subsequent teeth are separated from each other by a gap. In engaged position, the PTO coupler and the corresponding coupler are locked together so that the interlocking of the plurality of teeth counteracts axial load generated during operation.

In another aspect, the PTO coupler comprises a first and a second extremity. The first extremity is adapted to be connected to equipment. The second extremity has a plurality of teeth along a circumference thereof, wherein subsequent teeth are separated from one another by a gap, and each of the teeth has a base narrower than its top. When the PTO coupler is engaged to a corresponding receiving coupler, the plurality of teeth and gaps counteract axial load generated during operation.

In another aspect, the present disclosure provides an equipment comprising a PTO coupler. The PTO coupler comprises a first and a second extremity. The first extremity is adapted to be mechanically connected to an equipment. The second extremity has a plurality of teeth along a circumference thereof, wherein subsequent teeth are separated from each other by a gap. At least one tooth on the coupler has at least one side adjacent to a gap which is curve-shaped. The curve-shaped side is designed to mate the shape of one side a tooth localized on a corresponding coupler. In engaged position, the PTO coupler and the corresponding coupler are locked together so that the interlocking of the plurality of teeth counteracts axial load generated during operation.

BRIEF DESCRIPTION OF THE DRAWINGS

In the following description, the following drawings are used to describe and exemplify the present invention.

DETAILED DESCRIPTION

The industry of vehicles adapted to receive implements, and the industry of implements themselves are both quite vast. It goes from residential, commercial and industrial applications. Examples of vehicles adapted to receive implements include tractors, trucks, all terrain vehicles and heavy machinery. The variety of implements is wide since each implement usually corresponds to a particular task to be performed. Some of those implements require power to function. Non-restrictive examples of implements requiring power are rotary-cutter, post-hole-digger and finish mower. Various types of power may be required to activate an implement such as hydraulic power, pneumatic power, electrical power and motion generated by an engine of the vehicle.

To convey the motion generated by the engine of a vehicle to an implement, many vehicles and implements use a Power Take-Off (PTO) coupler. The PTO coupler conveys the motion generated by the engine by means of a shaft, to the implement. Throughout the present specification, the expression «equipment» will be used to refer to either a vehicle or an implement.

Figure 1:
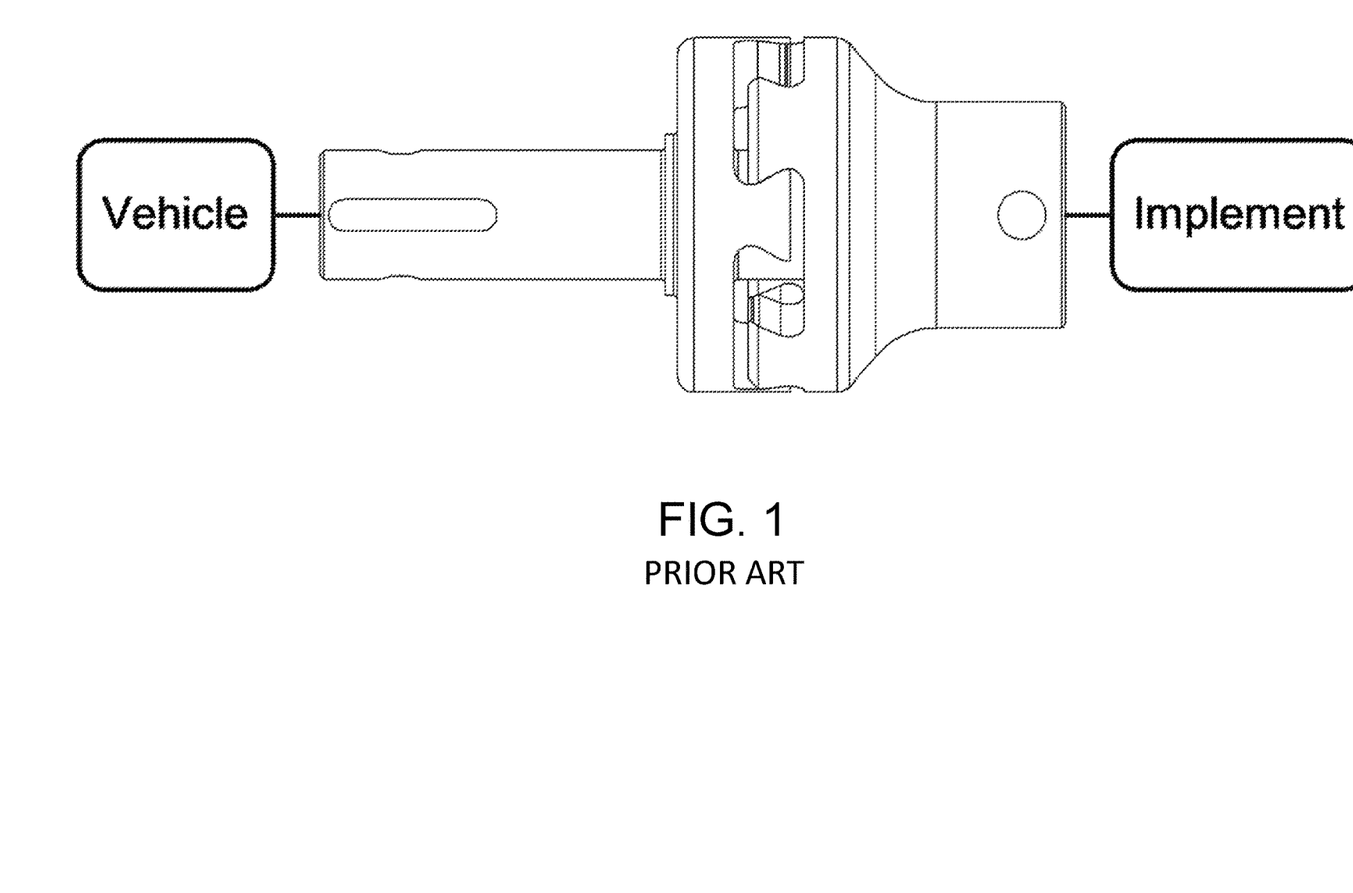
FIG. 1 is a side view of a prior art PTO coupler and a corresponding coupler in engaged position.
Figure 2:
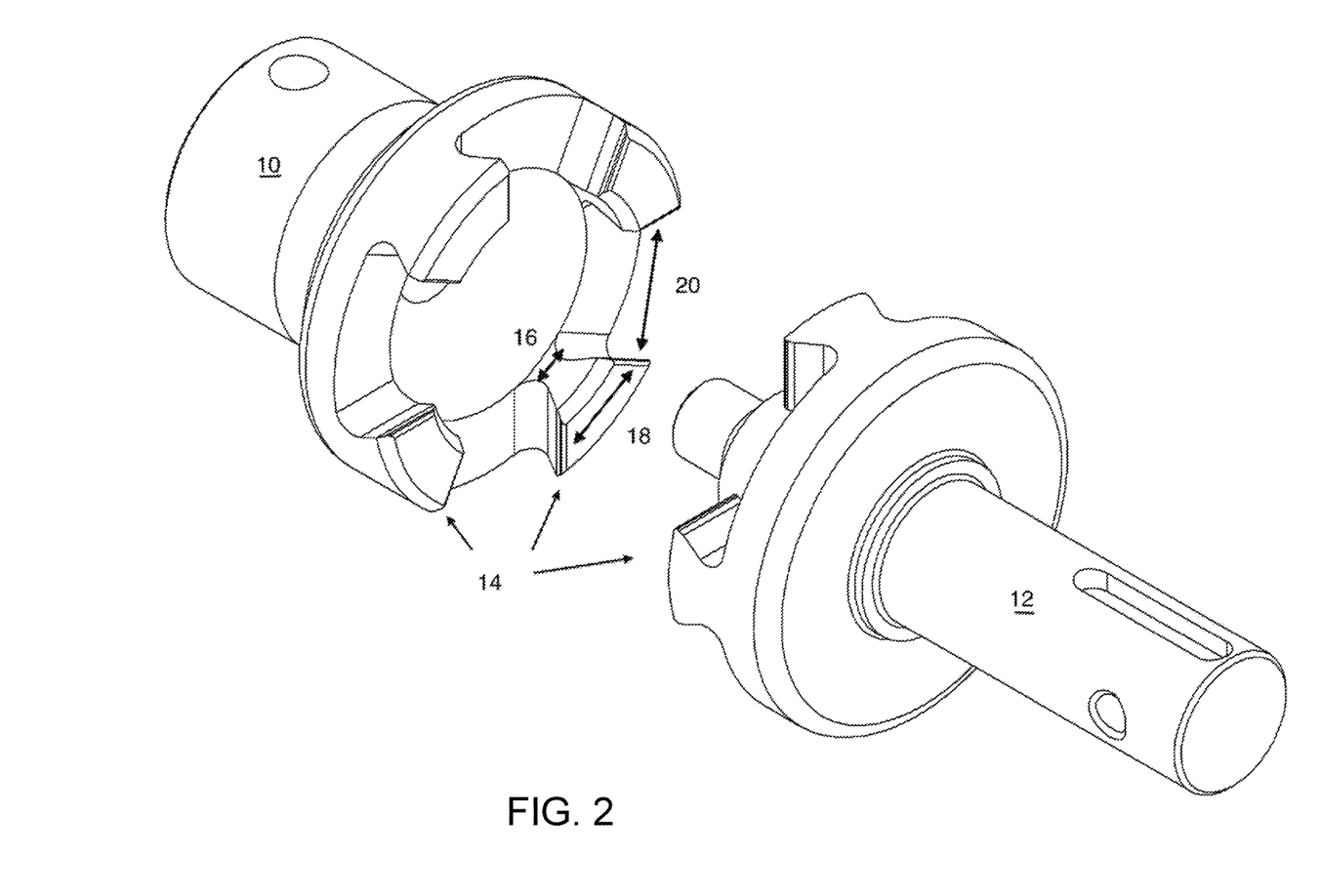
FIG. 2 is a perspective view of a PTO coupler and a corresponding coupler in disengaged position.
Figure 3:
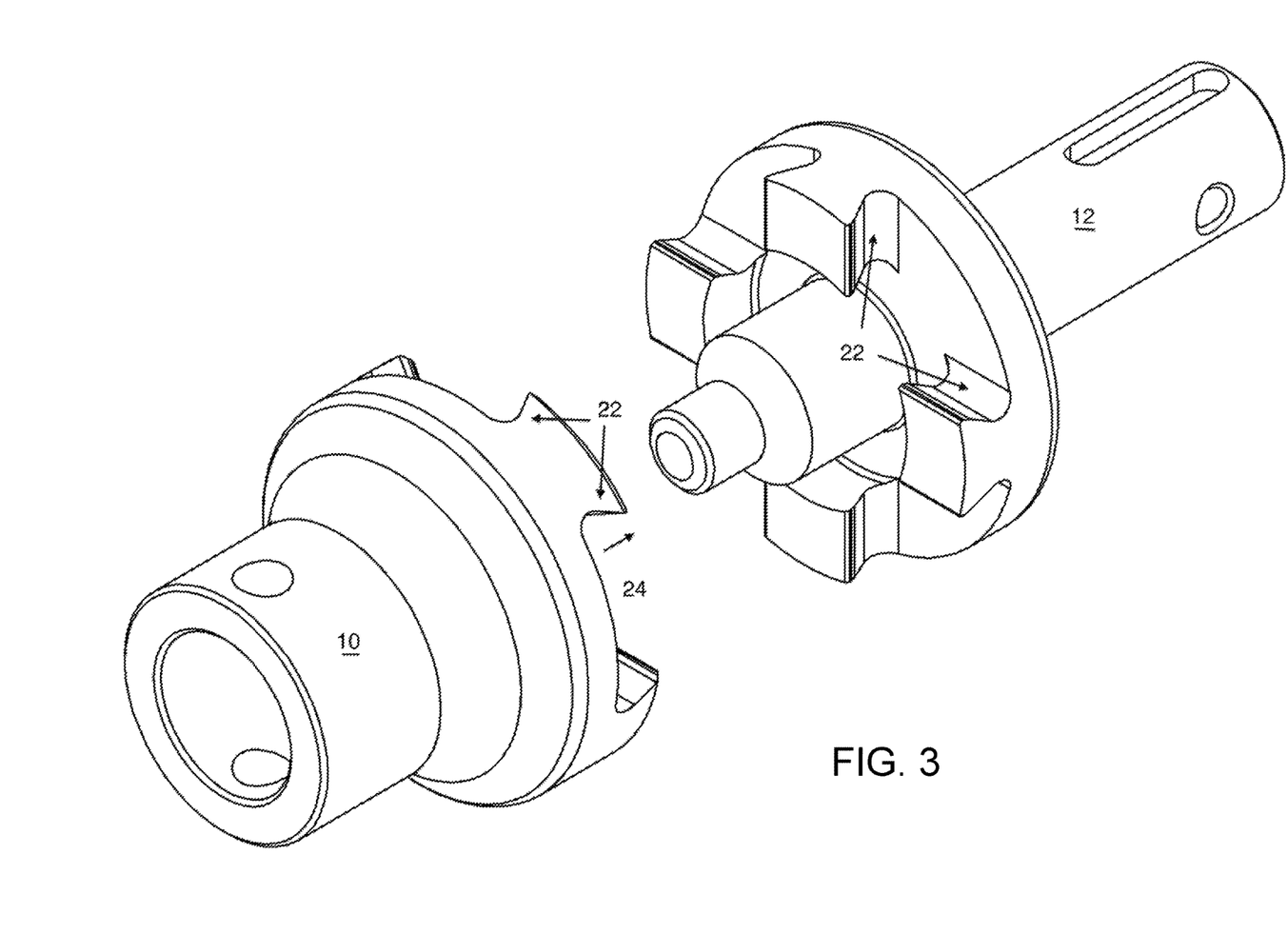
FIG. 3 is another perspective view of the PTO coupler and the corresponding coupler in disengaged position.
Figure 4:
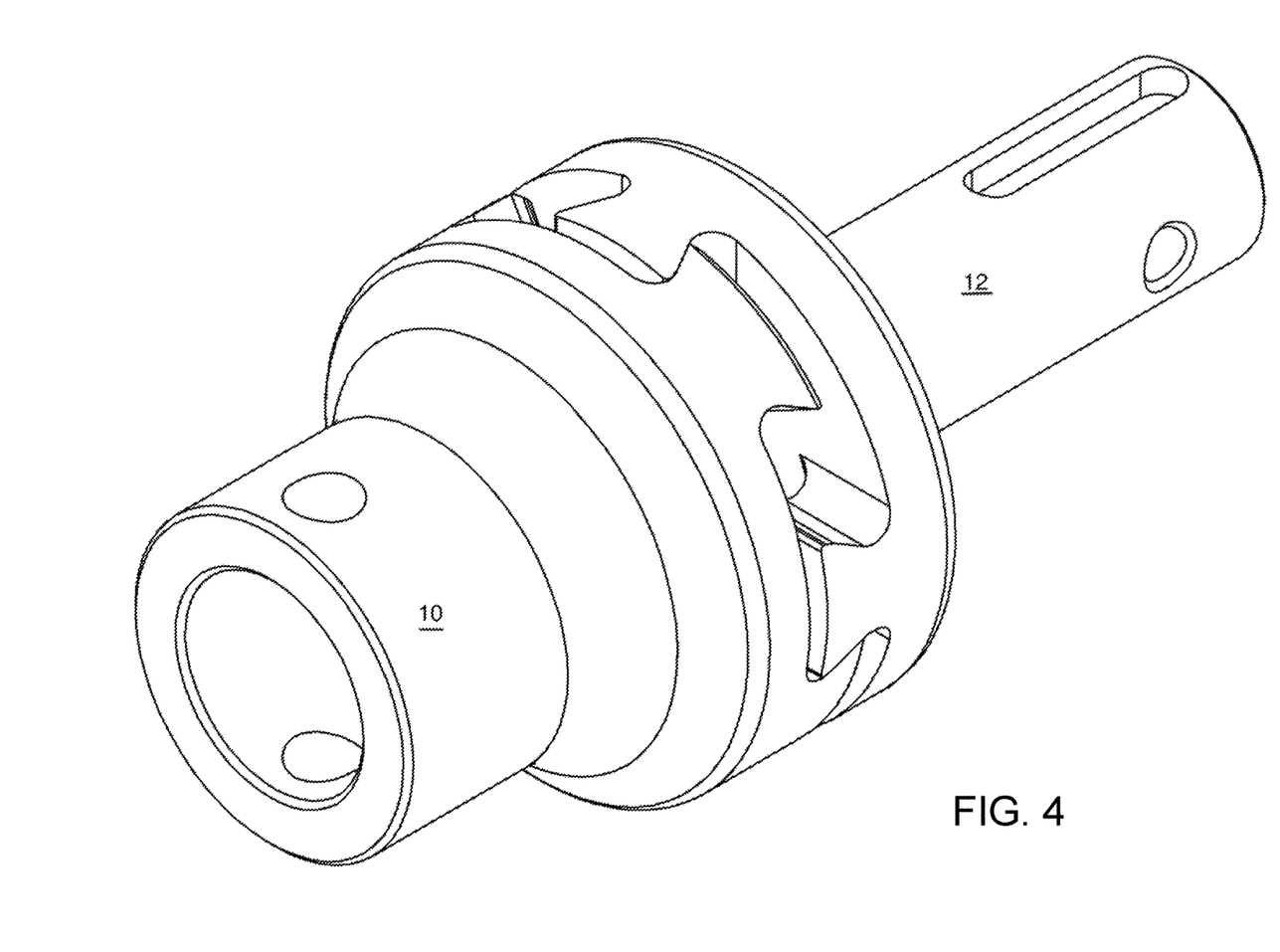
FIG. 4 is a perspective view of the PTO coupler and the corresponding coupler in engaged position.

An example of prior art PTO couplers in engaged position is provided in FIG. 1. The vehicle is provided with a PTO coupler, and the implement is provided with a corresponding PTO coupler. In engaged position, the engine of the vehicle provides a rotational force to the PTO coupler connected to the vehicle, which drives the corresponding coupler of the implement thereby transferring power to the implement. However, during operation, an axial load is created on the PTO coupler, which may result in disengagement of the PTO coupler from the corresponding coupler, and interruption of the powering of the implement.

To alleviate this problem, the present disclosure provides a PTO coupler capable of resisting axial load. The present PTO coupler is adapted to be installed on any equipment, either vehicle or implement.

Figure 5:
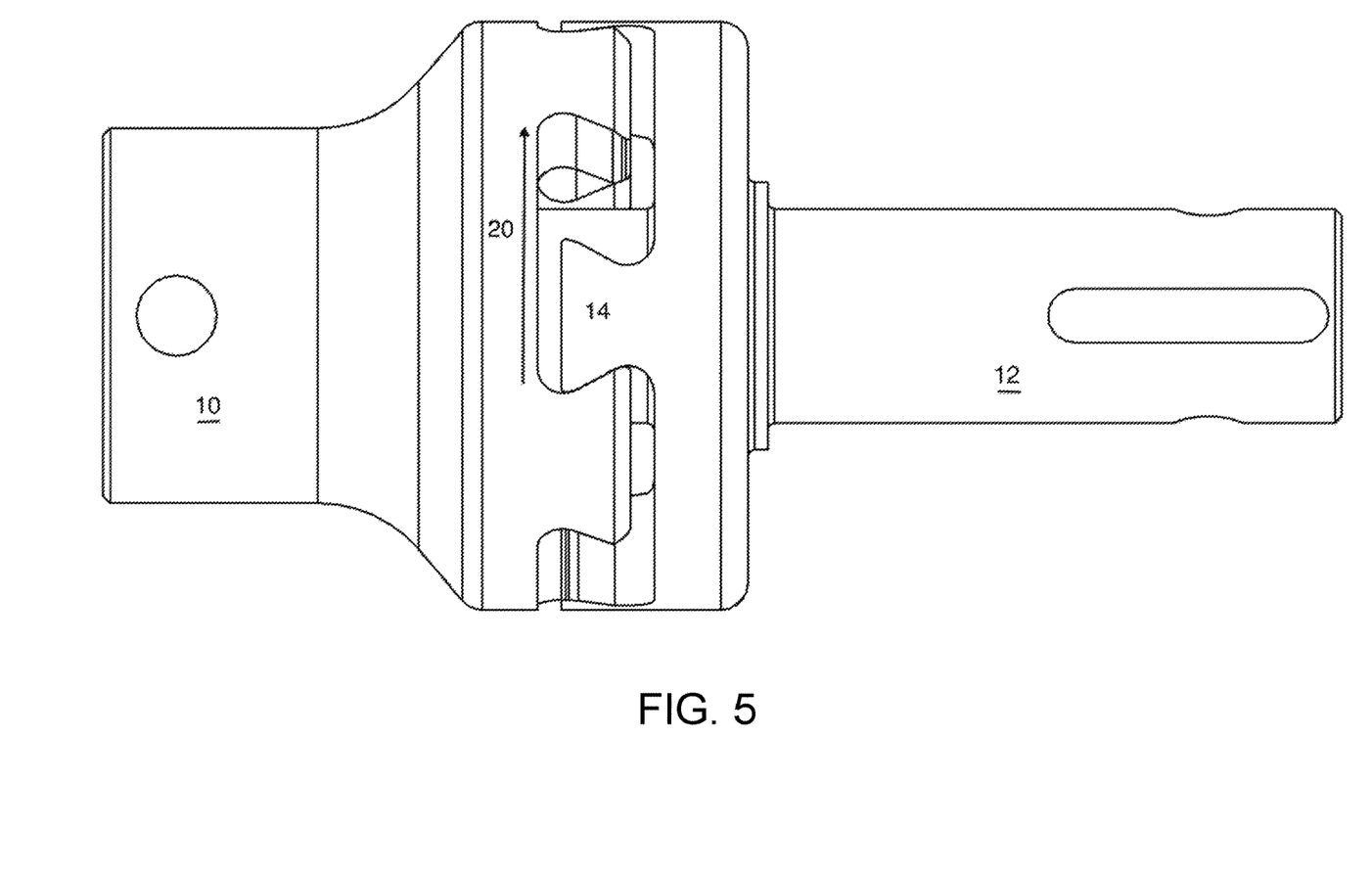
FIG. 5 is a side view of the PTO coupler and the corresponding coupler in engaged position during operation.

Reference is now made to FIGS. 2-5 which all depict exemplary views of a PTO coupler 10 and a corresponding coupler 12. These figures respectively depict the PTO coupler 10 and the corresponding coupler 12 disengaged (FIGS. 2 and 3), engaged (FIG. 4), and engaged in operation (FIG. 5). The PTO coupler 10 and the corresponding coupler 12 may either be male or female.

Although not shown on FIGS. 2-5, the PTO coupler 10 has a first extremity adapted to be mechanically connected by any means known in the art, directly or indirectly to an engine of a vehicle, so as to provide mechanical power.

The PTO coupler 10 has a second extremity, which has a plurality of teeth 14 along a circumference thereof. Although four teeth 14 are depicted on the present Figures, the present PTO coupler 10 is not limited to such a number of teeth. Alternatively, the present PTO coupler 10 could have fewer or more teeth, as long as both the PTO coupler 10 and the corresponding coupler 12 share a similar configuration. The expression «similar configuration» is meant to encompass configurations of teeth in which at least one tooth of the PTO coupler and one tooth of the corresponding coupler has a base 16 that is narrower than its top 18. In a particular aspect, the teeth 14 have an inversed-trapezoid shape. It is also encompassed that the teeth 14 have somewhat rounded corners at their top 18 and/or base 16.

Subsequent teeth 14 of the PTO coupler 10 and the corresponding coupler 12 are separated by a gap 20. Each gap 20 is longer than a width of the top of the teeth 14 on the other coupler, so as to be able to receive therein one of the teeth of the other coupler.

Since the width of the top of the teeth is greater that the width of its base, the width of the tooth varies along a height of the tooth. The variation may be linear, elliptical, curved, etc.

In a particular aspect, the gaps 20 have a width that is at least 1.5 times the width of the top of each tooth 14. This spacing consideration facilitates engagement and disengagement of the PTO coupler 10 with the corresponding coupler 12. However, the ratio between the width of the gap and the width of the tooth could vary greatly, without departing from the scope of the present disclosure and claims.

Reference is now made to FIG. 5, which depicts the present PTO coupler 10 engaged to the corresponding coupler 12, in operation with their teeth 14 interlocked. During operation, the PTO coupler 10 and the corresponding coupler 12 rotate together. Teeth 14 of the PTO coupler 10 and the corresponding coupler 12 are interlocked so as to counteract an axial load generated during operation. The interlocking of the teeth 14 of the PTO coupler 10 and the corresponding coupler 12 prevents disconnection of the PTO coupler 10 from the corresponding coupler 12. As can be appreciated, symmetrical teeth configurations will prevent disconnection caused by axial load in both directions of rotation, while asymmetrical configurations of teeth may not provide such disconnection in both directions of rotation.

Figure 6:
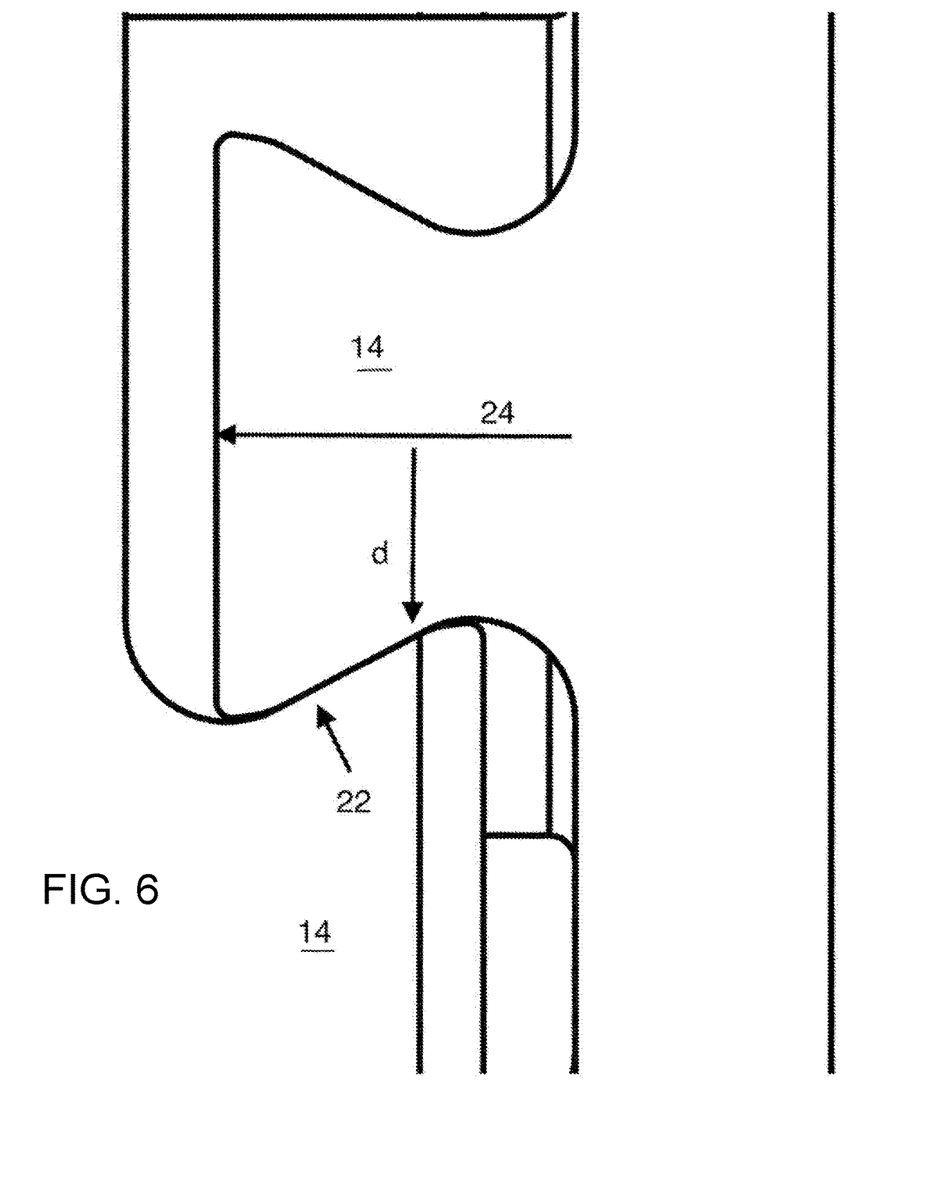
FIG. 6 is a partial side view of teeth of the PTO coupler and the corresponding coupler in engaged position.

FIG. 6 is a partial side view of interlocked teeth of the PTO coupler 10 and the corresponding coupler 12. On that figure d corresponds to a distance between a side 22 and a mid-plan 24 of a tooth. The tooth 14 may interlock with the corresponding tooth 14 when the value for d increases from the bottom, to the top of the tooth. When this condition is fulfilled, an axial force component resulting from the rotation of the interlocked teeth of the PTO coupler 10 and the corresponding coupler 12 is inferred in a direction opposed to a tensile axial load.

PTO couplers with significantly different teeth patterns may be designed. In a particular embodiment, teeth pattern and shape of the PTO coupler 10 may be identical to the teeth pattern and shape of the corresponding coupler 12. In this specific case, both couplers are identical. An example of this situation is provided in FIGS. 2-5. In a specific case, all teeth 14 have an inversed-trapezoid shape.

Other configurations of teeth pattern and shape are also allowed as long as the interlocking requirement is preserved. In a specific aspect, the PTO coupler and the corresponding coupler have two different teeth patterns (not show). In others embodiments, each tooth in a pattern may have two different curved sides. In another aspect, all teeth may not necessary be identical. Furthermore, all teeth do not need to be lock to their corresponding teeth. At least one teeth need to lock to generate a component of the force against the axial load. In another embodiment, it is preferable that teeth 14 have somewhat rounded corners.

Figure 7:
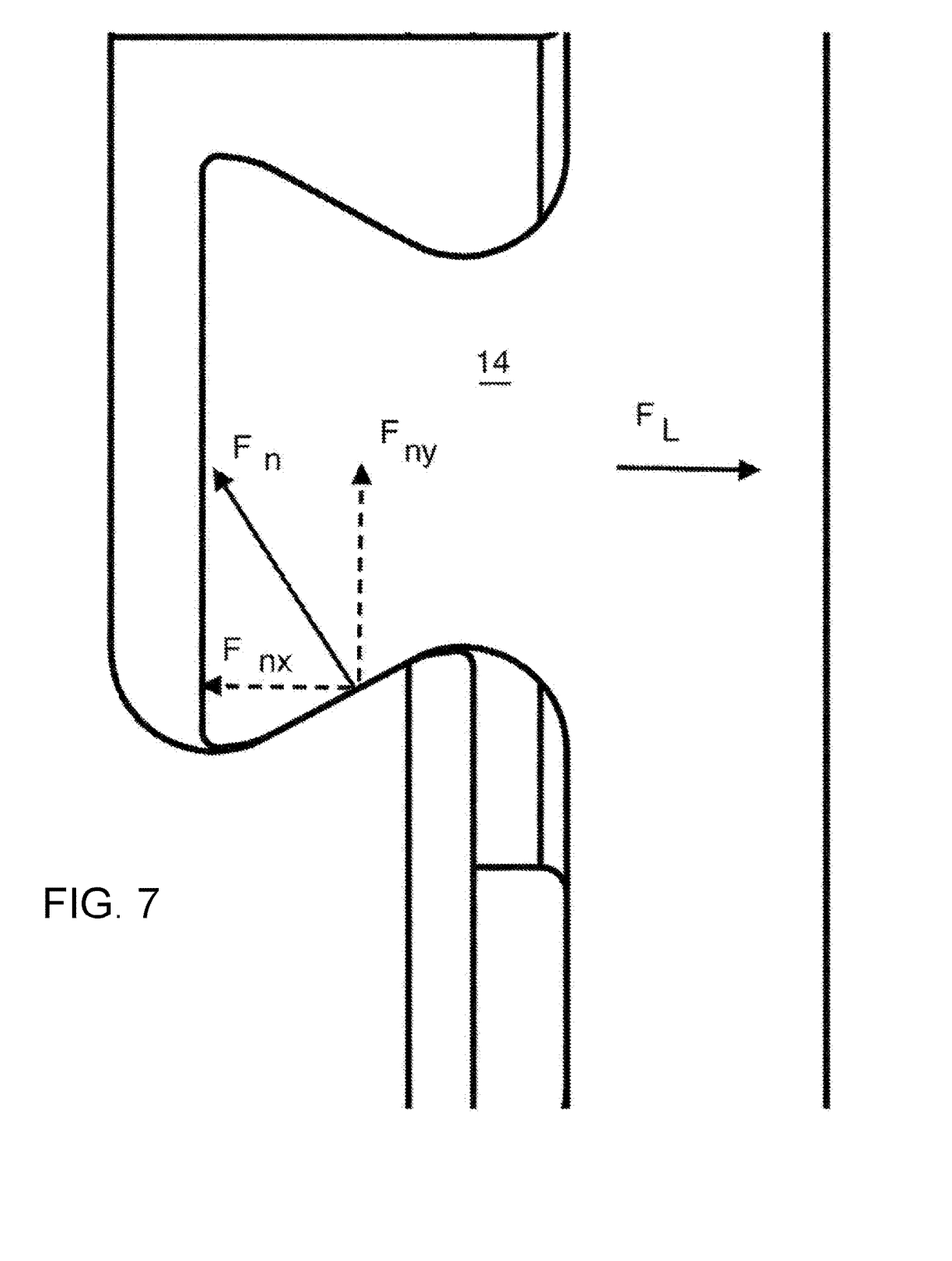
FIG. 7 is a partial side view of the PTO coupler and the corresponding coupler in engaged position superimposed with a diagram of forces involved during operation.

FIG. 7 presents a partial side view of a tooth of the PTO coupler interlocked with a tooth of the corresponding coupler, superimposed with a diagram of the forces involved between the implement and the vehicle during operation. The force corresponding to the axial load $F_L$ is inferred by the rotation. The normal force $F_n$ is localized perpendicular to the surface of contact formed when two adjacent teeth are in contact. The normal force $F_n$ may be decomposed in two components called $F_{nx}$ and $F_{ny}$, respectively called the parallel and the perpendicular components of the force. When all teeth are considered, the perpendicular component vanishes since the teeth are located along a circular path. However, for interlocking configuration, the resulting parallel component of the force counteracts the axial load and disengagement of the implement is prevented.

Figure 8A:
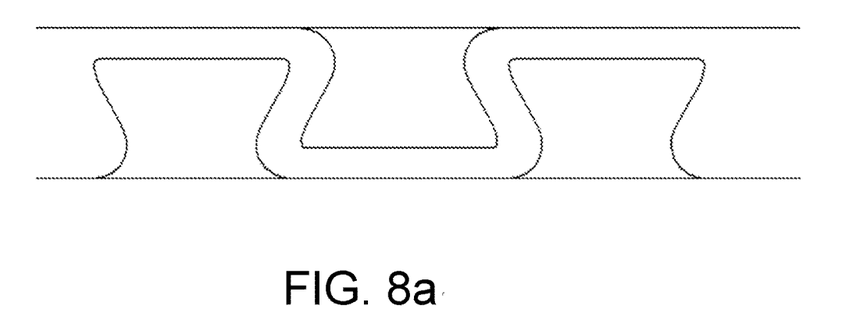
FIGS. 8a, 8b and 8c are side views of examples of shapes of teeth of the PTO coupler.
Figure 8B:
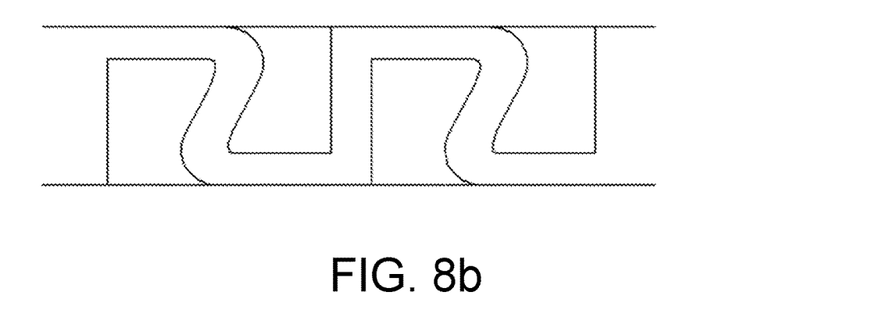
Figure 8C:
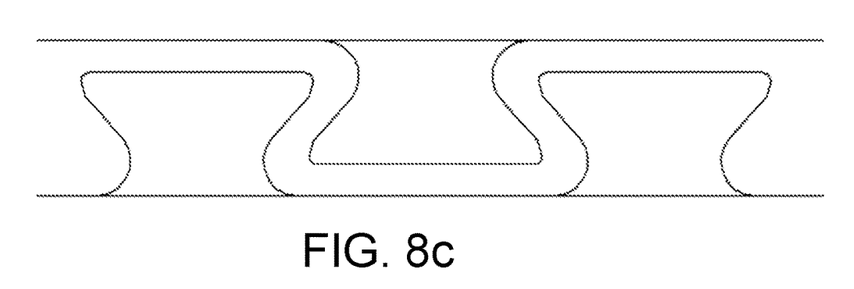

FIGS. 8a, 8b and 8c depict side views of examples of shapes of teeth of the PTO coupler.

The present PTO coupler has been described by way of preferred embodiments. It should be clear to those skilled in the art that the described preferred embodiments are for exemplary purposes only, and should not be interpreted to limit the scope of the present PTO coupler. The scope of the present PTO coupler should be defined by reference to the appended claims, which clearly delimit the protection sought.

What is claimed is:

1. A Power Take-Off (PTO) coupler assembly comprising:
   a PTO coupler, the PTO coupler having an extremity comprising a plurality of teeth along a circumference thereof, wherein subsequent teeth along the circumference are separated by a gap, each of the teeth has a base narrower than its top, and each gap has a minimum width that is at least 1.5 times the width of the top of the teeth; and
   a corresponding PTO coupler, the corresponding PTO coupler having an extremity comprising a plurality of teeth along a circumference thereof, wherein subsequent teeth along the circumference of the extremity of the corresponding PTO coupler are separated by a gap, each of the teeth of the extremity of the corresponding PTO coupler has a base narrower than its top, and each gap of the extremity of the corresponding PTO coupler has a minimum width that is at least 1.5 times the width of the top of the teeth of the corresponding PTO coupler,
   whereby, when the extremity of the PTO coupler is engaged to the extremity of the corresponding PTO coupler, the teeth and gaps of the extremity of the PTO coupler interlock with the teeth and gaps of the extremity of the corresponding PTO coupler in both directions of rotation, each tooth of the PTO coupler being in contact with a corresponding tooth of the corresponding PTO coupler.

2. The PTO coupler assembly of claim 1, wherein each one of the plurality of teeth of the extremity of the PTO coupler and each one of the plurality of teeth of the extremity of the corresponding PTO coupler are shaped as an inversed trapezoid.

3. The PTO coupler assembly of claim 2, wherein each one of the plurality of teeth of the extremity of the PTO coupler and each one of the plurality of teeth of the extremity of the corresponding PTO coupler has rounded corners along its top.

4. The PTO coupler assembly of claim 1, wherein each of the gaps of the extremity of the PTO coupler and each of the gaps of the extremity of the corresponding PTO coupler are concave.

5. The PTO coupler assembly of claim 1, wherein each of the gaps of the extremity of the PTO coupler defines a shape complementary to one of the adjacent teeth of the extremity of the corresponding PTO coupler.

\* \* \* \* \*